United States Patent
Li et al.

(10) Patent No.: US 12,436,262 B2
(45) Date of Patent: Oct. 7, 2025

(54) RADAR DETECTION METHOD AND RELATED APPARATUS

(71) Applicant: Shenzhen Yinwang Intelligent Technologies Co., Ltd., Shenzhen (CN)

(72) Inventors: Qiang Li, Beijing (CN); Menglin Li, Beijing (CN); Tong Jiang, Beijing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 371 days.

(21) Appl. No.: 18/148,625

(22) Filed: Dec. 30, 2022

(65) Prior Publication Data

US 2023/0140139 A1 May 4, 2023

Related U.S. Application Data

(63) Continuation of application No. PCT/CN2020/099558, filed on Jun. 30, 2020.

(51) Int. Cl.
*G01S 13/58* (2006.01)
*G01S 13/89* (2006.01)

(52) U.S. Cl.
CPC ........... *G01S 13/584* (2013.01); *G01S 13/89* (2013.01)

(58) Field of Classification Search
CPC .... G01S 13/931; G01S 13/584; G01S 13/343; G01S 13/345; G01S 13/18; G01S 7/356
USPC ................... 342/109, 70, 196, 192
See application file for complete search history.

(56) References Cited

U.S. PATENT DOCUMENTS

| | | | | |
|---|---|---|---|---|
| 5,845,241 A | * | 12/1998 | Owechko | G06F 17/141 704/203 |
| 6,275,283 B1 | * | 8/2001 | Hasson | G01S 13/86 250/342 |
| 6,337,654 B1 | * | 1/2002 | Richardson | G01S 7/412 342/25 A |
| 6,437,728 B1 | * | 8/2002 | Richardson | G01S 7/412 342/25 A |
| 7,269,096 B2 | * | 9/2007 | Millikin | G01S 13/86 367/127 |

(Continued)

FOREIGN PATENT DOCUMENTS

| | | |
|---|---|---|
| CN | 106291524 A | 1/2017 |
| CN | 107169435 A | 9/2017 |
| CN | 107270952 A | 10/2017 |

OTHER PUBLICATIONS

Duan, Y., et al., "Research on Weak Chirp Signal Oetection Based on Cubic Spline Interpolation", 2019 11th International Conference On Intelligent Human-Machine Systems and Cybernetics (IHMSC), IEEE, vol. 1, Aug. 24, 2019, pp. 37-40, XP033680347.

*Primary Examiner* — Michael W Justice
(74) *Attorney, Agent, or Firm* — Conley Rose, P.C.

(57) ABSTRACT

A radar detection method includes transforming a beat frequency signal of a radar into a two-dimensional spectrogram; intercepting, based on a time domain sliding step, a plurality of measurement units (MUs) whose time domain lengths are equal to a frequency modulation period of the radar from the two-dimensional spectrogram, where a length of the time domain sliding step is less than the frequency modulation period of the radar; and determining a radar detection result based on each of the plurality of MUs.

18 Claims, 15 Drawing Sheets

(56) References Cited

U.S. PATENT DOCUMENTS

| | | | | |
|---|---|---|---|---|
| 8,369,622 | B1* | 2/2013 | Hsu | G06V 10/267 |
| | | | | 382/181 |
| 8,854,030 | B2* | 10/2014 | Martens | G01R 31/3163 |
| | | | | 324/76.39 |
| 9,507,042 | B2* | 11/2016 | Puryear | G01V 1/30 |
| 10,795,012 | B2* | 10/2020 | Santra | G06V 40/23 |
| 10,966,663 | B2* | 4/2021 | Lorato | G01S 13/50 |
| 11,408,978 | B2* | 8/2022 | Wang | A61B 5/0816 |
| 11,461,442 | B2* | 10/2022 | Chen | G06F 21/316 |
| 2002/0057216 | A1* | 5/2002 | Richardson | G01S 13/9027 |
| | | | | 342/25 A |
| 2005/0117454 | A1* | 6/2005 | Millikin | G01S 13/723 |
| | | | | 367/127 |
| 2012/0007583 | A1* | 1/2012 | Martens | G01R 31/3163 |
| | | | | 324/76.39 |
| 2014/0067273 | A1* | 3/2014 | Puryear | G01V 1/30 |
| | | | | 702/14 |
| 2019/0008459 | A1* | 1/2019 | Lorato | A61B 5/05 |
| 2019/0025431 | A1* | 1/2019 | Satyan | G02F 1/21 |
| 2019/0227156 | A1* | 7/2019 | Santra | G01S 13/42 |
| 2019/0384898 | A1* | 12/2019 | Chen | G06F 21/36 |
| 2020/0300972 | A1* | 9/2020 | Wang | A61B 5/0002 |

* cited by examiner

S1101: A signal processing apparatus transforms a beat frequency signal of a radar into a two-dimensional spectrogram S1102: The signal processing apparatus intercepts, based on a time domain sliding step, a plurality of measurement units MUs whose time domain lengths are equal to a frequency modulation period of the radar from the two-dimensional spectrogram S1103: The signal processing apparatus determines a radar detection result based on each of the plurality of MUs

FIG. 11

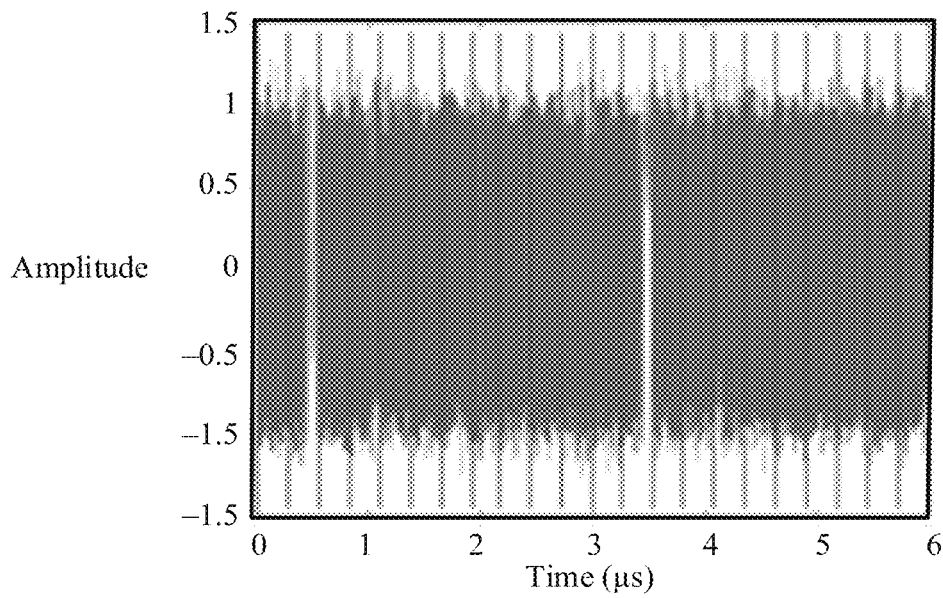

FIG. 12

RADAR DETECTION METHOD AND RELATED APPARATUS

CROSS-REFERENCE TO RELATED APPLICATIONS

This is a continuation of International Patent Application No. PCT/CN2020/099558 filed on Jun. 30, 2020. The disclosure of which is hereby incorporated by reference in its entirety.

TECHNICAL FIELD

This disclosure relates to the field of laser radar technologies, and in particular, to a radar detection method and a related apparatus.

BACKGROUND

A frequency-modulated continuous-wave (FMCW) radar is a ranging device. FMCW radars have different subdivided types. For example, a frequency modulated continuous wave radar using radio waves is an FMCW radar, and a frequency modulated continuous wave radar using lasers is an FMCW lidar. An FMCW radar includes a structure shown in FIG. 1 regardless of the type of the FMCW radar. In FIG. 1, the radar generates a radio frequency or laser signal on which frequency modulation is performed, and divides the generated frequency modulated signal into two channels. One channel is used as a local reference signal (also referred to as a local oscillator signal), and the other channel is emitted to a detected target object (also referred to as a reflective object) and reflected by a surface of the target object to form an echo signal.

FIG. 2 shows a process of processing a reference signal and an echo signal by an FMCW radar. As shown in part (a) in FIG. 2, a thick line indicates that frequencies of frequency modulated signals of a transmitted signal and the reference signal change with time. In the first half of time, a signal frequency increases from low to high with time, and in the second half of time, the signal frequency decreases from high to low with time. A fine line shows a changing process of the echo signal. A beat frequency signal may be output when the echo signal and the reference signal pass through a frequency mixer. A frequency of the beat frequency signal is a frequency difference between the reference signal and the echo signal, as shown in part (b) of FIG. 2. In an ideal condition, the beat frequency signal has a fixed frequency (as shown by a dashed-line part in the figure). As shown in part (c) of FIG. 2, the frequency of the beat frequency signal may be detected by performing frequency domain analysis (usually fast Fourier transform (FFT)) on the beat frequency signal. The frequency herein is in a one-to-one correspondence with a distance and a speed of the target object. Therefore, speed and distance information of the target object may be calculated based on the frequency of the beat frequency signal.

As shown in FIG. 3, there is usually a scanner in a laser radar. The scanner emits lasers in different directions by rotating a laser, and then gathers measurement results in all directions to obtain a 3D point cloud map. FIG. 4 shows a 3D point cloud map of the laser radar. A point cloud resolution of the laser radar is an important indicator. A high-resolution point cloud is very important for a machine vision algorithm used for autonomous driving or the like, and is critical to implementation of functions such as point cloud segmentation and target identification. Currently, measurement can be completed only once within a time domain length of one upper/lower chirp pair (that is, one frequency modulation period of a radar). In this case, an obtained point cloud resolution is low. Currently, a common method for improving a point cloud resolution is to add more lasers to a laser radar, for example, upgrading a 32-line lidar (that is, 32 lasers work at the same time) to a 128-line lidar (that is, there are 128 lasers or 128 lasers are simulated by optical components).

However, this manner of improving the point cloud resolution by adding hardware significantly increases costs, a size, and power consumption of the laser radar.

SUMMARY

Embodiments of this disclosure disclose a radar detection method and a related apparatus, so that a point output rate (that is, point cloud density) of a radar can be improved without lowering a signal-to-noise ratio or increasing costs significantly.

According to a first aspect, an embodiment of this disclosure discloses a radar detection method, and the method includes transforming a beat frequency signal of a radar into a two-dimensional spectrogram; intercepting, based on a time domain sliding step, a plurality of measurement units (MUs) whose time domain lengths are equal to a frequency modulation period of the radar from the two-dimensional spectrogram, where a length of the time domain sliding step is less than the frequency modulation period of the radar; and determining a radar detection result based on each of the plurality of MUs.

In the foregoing method, the beat frequency signal is transformed to obtain a frequency domain signal of a smaller granularity in time domain, and then MUs are intercepted on the frequency domain signal of the smaller granularity in a manner of sliding window. Because the sliding window interception is performed on the frequency domain signal of the smaller granularity, even if some intercepted MUs share a frequency band, a difference between different MUs can still be distinguished due to the small granularity of the frequency domain signal. In addition, because a time domain length of the time domain sliding step is less than the frequency modulation period of the radar, any two adjacent MUs in time domain share a part of frequency information. Therefore, even if a large quantity of MUs are intercepted, it can still be ensured that sufficient signal energy is accumulated in each MU, to ensure a signal-to-noise ratio. Therefore, in this manner, a point output rate can be improved without lowering the signal-to-noise ratio or increasing costs significantly.

In an optional solution of the first aspect, the transforming a beat frequency signal of a radar into a two-dimensional spectrogram includes: dividing the beat frequency signal in time domain to obtain a plurality of segments of sub-signals, where a time domain length of each segment of sub-signal is 1/N of the frequency modulation period of the radar, and N is greater than or equal to 2; separately performing Fourier transform on the plurality of segments of sub-signals to obtain frequency domain information of each of the plurality of segments of sub-signals; and generating the two-dimensional spectrogram based on the frequency domain information of each segment of sub-signal. The two-dimensional spectrogram may be obtained by combining each segment of sub-signals and the frequency domain information.

In an optional solution of the first aspect, the determining a radar detection result based on each of the plurality of MUs includes: finding, from a spectrum library through matching, a reference spectrum with a highest similarity for each MU, where the spectrum library records a plurality of reference spectrums, each reference spectrum corresponds to detection information, and the detection information includes at least one of distance information or speed information; and using detection information corresponding to the reference spectrum with the highest similarity of each MU as the radar detection result of each MU.

In the foregoing method, a reference spectrum that is closest to an MU and for which detection information is calculated is found from a spectrum library through matching, and then the detection information of the reference spectrum that is closest to the MU is used as a detection result of the MU instead of being calculated in real time. This significantly reduces a speed of determining a detection result of the MU at a single time, and effectively balances a computing pressure caused by an increase of the point output rate.

In an optional solution of the first aspect, before the finding, from a spectrum library through matching, a reference spectrum with a highest similarity for each MU, the method further includes: generating one reference spectrum based on one Doppler shift and one signal flight time; and using one piece of speed information and one piece of distance information as detection information corresponding to the one reference spectrum, and saving the speed information and the distance information in the spectrum library, where the one piece of speed information is the one Doppler shift or a moving speed of a reflective object corresponding to the one Doppler shift, and the one piece of distance information is the one signal flight time or a distance of a reflective object corresponding to the one signal flight time.

In an optional solution of the first aspect, the time domain sliding step d is obtained by performing a rounding operation on d0, and d0 meets the following relationship:

$$d0 = T_{chirp}/R$$

$T_{chirp}$ is the frequency modulation period of the radar, and R is an expected radar point cloud density improvement multiple.

It can be learned that a point cloud density can be adjusted to an expected density by configuring R, which is flexible and easy to implement.

According to a second aspect, an embodiment of this disclosure provides a signal processing apparatus, where the apparatus includes: a transform unit, configured to transform a beat frequency signal of a radar into a two-dimensional spectrogram; an interception unit, configured to intercept, based on a time domain sliding step, a plurality of MUs whose time domain lengths are equal to a frequency modulation period of the radar from the two-dimensional spectrogram, where a length of the time domain sliding step is less than the frequency modulation period of the radar; and an analysis unit, configured to determine a radar detection result based on each of the plurality of MUs.

In the foregoing method, a beat frequency signal is transformed to obtain a frequency domain signal of a smaller granularity in time domain, and then MUs are intercepted on the frequency domain signal of the smaller granularity in a sliding window manner. Because the sliding window interception is performed on the frequency domain signal of the smaller granularity, even if some intercepted MUs share a frequency band, a difference between different MUs can still be distinguished due to the small granularity of the frequency domain signal. In addition, because a length of a time domain sliding step in time domain is less than the frequency modulation period of the radar, any two adjacent MUs in time domain share a part of frequency information. Therefore, even if a large quantity of MUs are intercepted, it can still be ensured that sufficient signal energy is accumulated in each MU, to ensure a signal-to-noise ratio. Therefore, in this manner, the point output rate can be improved without lowering the signal-to-noise ratio or increasing costs significantly.

In an optional solution of the second aspect, a two-dimensional time-frequency transform is short-time Fourier transform, and the transform unit is further configured to: divide the beat frequency signal of the radar in time domain to obtain a plurality of segments of sub-signals, where a time domain length of each segment of sub-signal is 1/N of the frequency modulation period of the radar, and N is greater than or equal to 2; separately perform Fourier transform on the plurality of segments of sub-signals to obtain frequency domain information of each of the plurality of segments of sub-signals; and generate the two-dimensional spectrogram based on the frequency domain information of each segment of sub-signal. The two-dimensional spectrogram may be obtained by combining each segment of sub-signals and the frequency domain information.

In an optional solution of the second aspect, the interception unit is further configured to: find, from a spectrum library through matching, a reference spectrum with a highest similarity for each MU, where the spectrum library records a plurality of reference spectrums, each reference spectrum corresponds to detection information, and the detection information includes at least one of distance information or speed information; and use detection information corresponding to the reference spectrum with the highest similarity of each MU as the radar detection result of each MU.

In the foregoing method, a reference spectrum that is closest to an MU and for which detection information is calculated is found from a spectrum library through matching, and then the detection information of the reference spectrum that is closest to the MU is used as a detection result of the MU instead of being calculated in real time. This significantly reduces a speed of determining a detection result of the MU at a single time, and effectively balances a computing pressure caused by an increase of the point output rate.

In an optional solution of the second aspect, the apparatus further includes: a generation unit, configured to generate one reference spectrum based on one Doppler shift and one signal flight time; and a saving unit, configured to use one piece of speed information and one piece of distance information as detection information corresponding to the one reference spectrum, and save the speed information and the distance information in the spectrum library, where the one piece of speed information is the one Doppler shift or a moving speed of a reflective object corresponding to the one Doppler shift, and the one piece of distance information is the one signal flight time or a distance of a reflective object corresponding to the one signal flight time.

In an optional solution of the second aspect, the time domain sliding step d is obtained by performing a rounding operation on d0, and d0 meets the following relationship:

$$d0 = T_{chirp}/R$$

$T_{chirp}$ is the frequency modulation period of the radar, and R is an expected radar point cloud density improvement multiple.

It can be learned that a point cloud density can be adjusted to an expected density by configuring R, which is flexible and easy to implement.

According to a third aspect, an embodiment of this disclosure provides a processor. The processor is configured to invoke a computer program stored in a computer-readable storage medium, to implement the method described in any one of the first aspect or an optional implementation of the first aspect.

According to a fourth aspect, an embodiment of this disclosure provides a laser radar system. The laser radar system includes a processor, a memory, and a laser. The laser is configured to transmit a laser signal. The memory is configured to store a computer program. The processor is configured to invoke the computer program to implement the method described in any one of the first aspect or an optional implementation of the first aspect.

According to a fifth aspect, an embodiment of this disclosure provides a computer-readable storage medium. The computer-readable storage medium stores a computer program, and when the computer program is run on a processor, the method described in any one of the first aspect or an optional implementation of the first aspect is implemented.

BRIEF DESCRIPTION OF DRAWINGS

FIG. 11 is a schematic flowchart of a radar detection method according to an embodiment of this disclosure;

FIG. 12 is a schematic diagram of a beat frequency signal according to an embodiment of this disclosure;

DESCRIPTION OF EMBODIMENTS

The following describes embodiments of this disclosure with reference to the accompanying drawings in embodiments of this disclosure.

A laser radar in embodiments of this disclosure can be applied to various fields such as intelligent transportation, autonomous driving, atmospheric environment monitoring, geographic surveying and mapping, and uncrewed aerial vehicles, and can complete functions such as distance measurement, speed measurement, target tracking, and imaging recognition.

Figure 5:
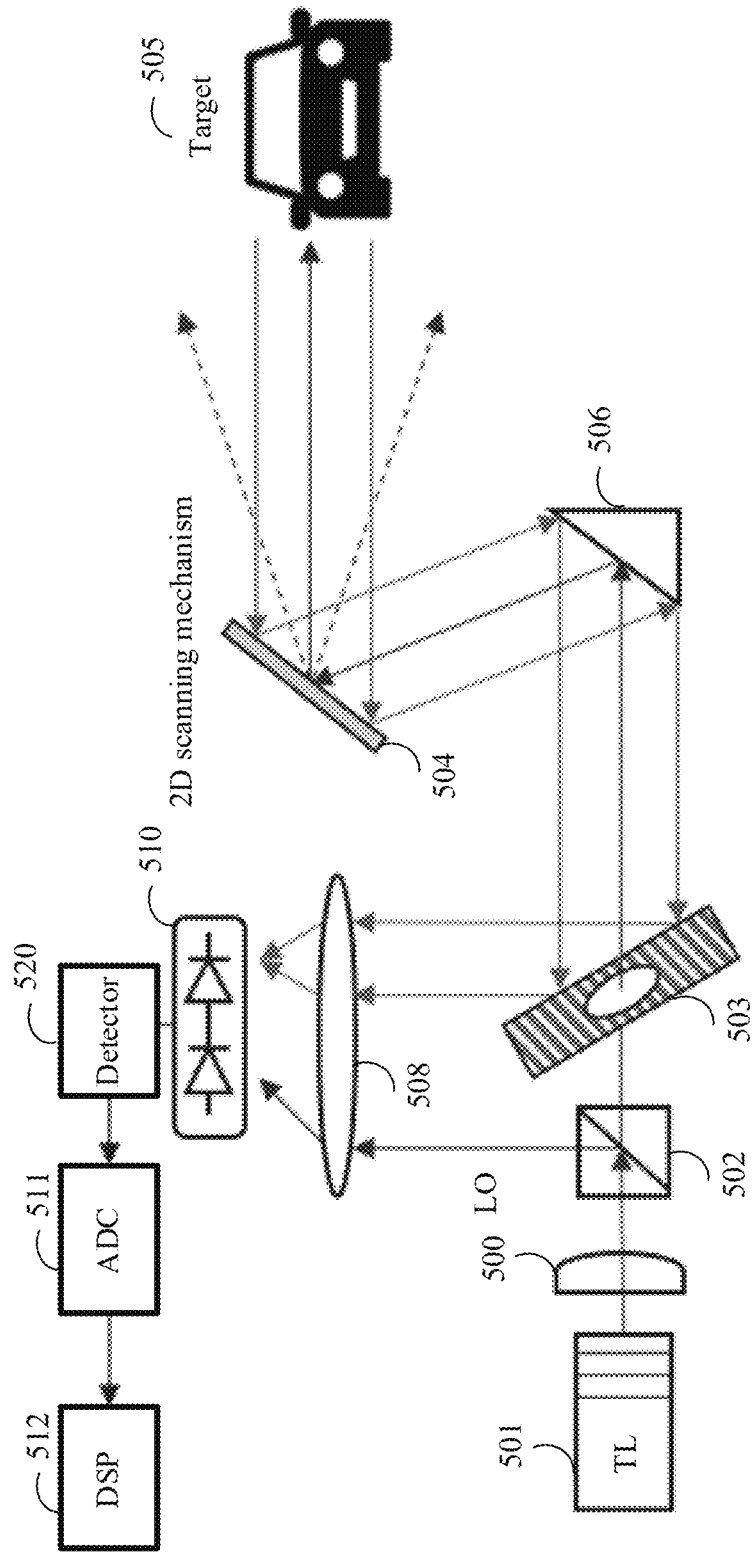
FIG. 5 is a schematic diagram of an architecture of a laser radar system according to an embodiment of this disclosure.

Refer to FIG. 5. FIG. 5 is a schematic diagram of a structure of a laser radar system according to an embodiment of this disclosure. The laser radar system is configured to detect information about a target object 505. The laser radar system includes: a laser 501, which may be, for example, a frequency modulation laser (Tunable Laser, TL), and is configured to generate a laser signal, where the laser signal may be a linear frequency-modulated laser signal, and a modulated waveform of a frequency of the laser signal may be a saw wave, a triangle wave, or a waveform in another form; a splitter 502, configured to split a laser generated by the laser 501 to obtain a transmitted signal and a local oscillator (LO) signal, where the local oscillator signal is also referred to as a reference signal, a collimation lens 500 may optionally be further disposed between the laser 501 and the splitter, and the lens 500 is configured to perform beam shaping on a laser signal output to the splitter 502; a collimator 503, configured to couple a transmitted signal into a scanner 504 with maximum efficiency; the scanner 504, also referred to as a 2D scanning mechanism, configured to transmit a transmitted signal at a specific angle, where after the transmitted signal is transmitted, the transmitted signal is reflected back by the target object 505 to form an echo signal, the scanner 504 is further configured to receive the echo signal, and after passing through a corresponding optical device (for example, a mirror reflector 506 (optional) and a receiving lens 508 (optional)), the echo signal converges with the local oscillator signal at a frequency mixer 510; the frequency mixer 510, configured to perform frequency mixing processing on the local oscillator signal and the echo signal to obtain a beat frequency signal; a detector 520, configured to extract the beat frequency signal from the frequency mixer, where the detector 520 may be, for example, a balanced photo-detector (BPD); an analog-to-digital converter (ADC) 511, configured to sample the beat frequency signal, where the sampling is essentially a process of converting an analog signal into a digital signal; and a processor 512, where the processor may include a device having a computing capability, such as a digital signal processor (DSP), a central processing unit (CPU), an accelerated processing unit (APU), a graphics processing unit (GPU), a microprocessor, or a microcontroller, the accompanying drawing uses a DSP as an example for description, and the processor is configured to process the beat frequency signal obtained through sampling, to obtain information such as a speed and a distance of the target object.

In this embodiment of this disclosure, the target object 505 is also referred to as a reflective object. The target object 505 may be any object in a scanning direction of the scanner 504, for example, may be a person, a mountain, a vehicle, a tree, or a bridge. FIG. 5 uses a vehicle as an example for illustration.

In this embodiment of this disclosure, an operation of processing a beat frequency signal obtained through sampling to obtain information such as a speed and a distance of the target object may be completed by one or more processors 512, for example, by one or more DSPs, or may be completed by one or more processors 512 in combination with another component, for example, a DSP in combination with one or more central processing units CPUs. When processing the beat frequency signal, the processor 512 may further invoke a computer program stored in a computer-readable storage medium. The computer-readable storage medium includes but is not limited to a random-access memory (RAM), a read-only memory (ROM), an erasable programmable read-only memory (EPROM) or a compact disc read-only memory (CD-ROM). The computer-readable storage medium may be disposed on the processor 512, or may be independent of the processor 512.

In this embodiment of this disclosure, there may be one or more components mentioned above. For example, there may be one or more lasers 501. When there is one laser 501, the laser 501 may alternately transmit a laser signal with a positive slope and a laser signal with a negative slope in time domain. When there are two lasers 501, one laser 501 transmits a laser signal with a positive slope, and the other laser 501 transmits a laser signal with a negative slope, and the two lasers 501 may synchronously transmit laser signals.

Figure 6:
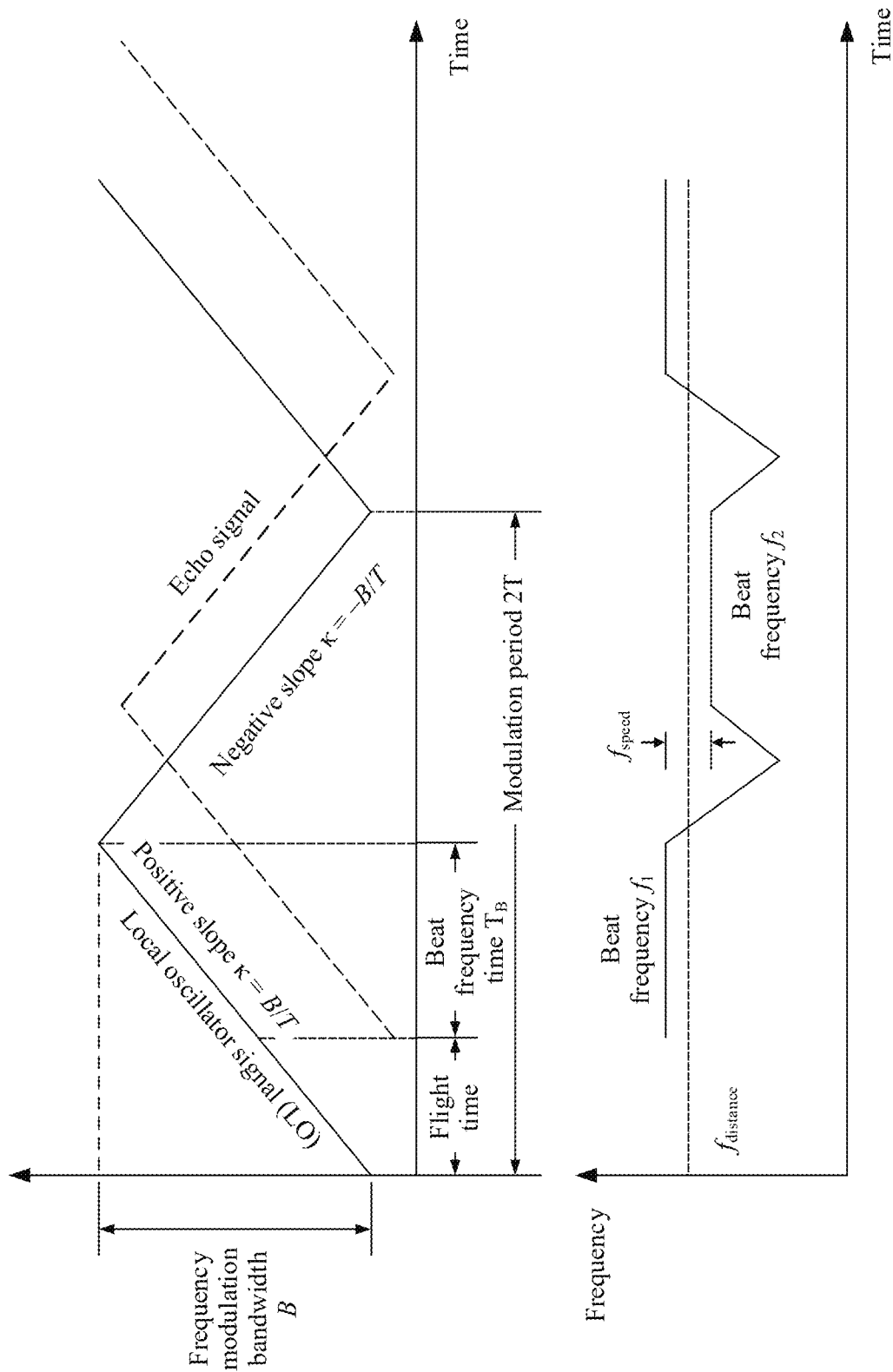
FIG. 6 is a schematic diagram of a beat frequency signal generated by a triangle wave according to an embodiment of this disclosure.

As shown in FIG. 6, for example, a modulation waveform of a laser signal frequency is triangle wave linear frequency modulation. After a period of flight time, an echo signal is mixed with a local oscillator signal LO. This period of flight time is a period of time from a moment when a transmitted signal divided from a laser signal starts to be emitted to a moment when the echo signal returns. A beat frequency signal generated by the echo signal and the local oscillator signal after the flight time is constant in a specific period of time, and can accurately reflect distance information and speed information of a target object. This period of time is a beat frequency time. The beat frequency signal can include a beat frequency $f_1$ corresponding to a positive slope and a beat frequency $f_2$ corresponding to a negative slope. A spectrum $f_{speed}$ related to a speed of the target object may be represented as $f_{speed}=(f_1-f_2)/2$, and a frequency $f_{distance}$ related to a distance of the target object may be represented as $f_{distance}=(f_1+f_2)/2$. After $f_{speed}$ and $f_{distance}$ are obtained, the distance between the target object (and the laser radar) and the moving speed of the target object can be obtained through calculation.

To measure information about a target object at a longer distance, a coherent laser radar increases a beat frequency time of each measurement unit (MU) (one MU is used to obtain a detection result of one measurement point), to accumulate more energy in a process of processing the beat frequency signal, so as to achieve a higher signal-to-noise ratio. During actual implementation, the laser radar is required to have a higher point output rate, so that the laser radar obtains a higher field-of-view resolution and frame rate.

Figure 7:
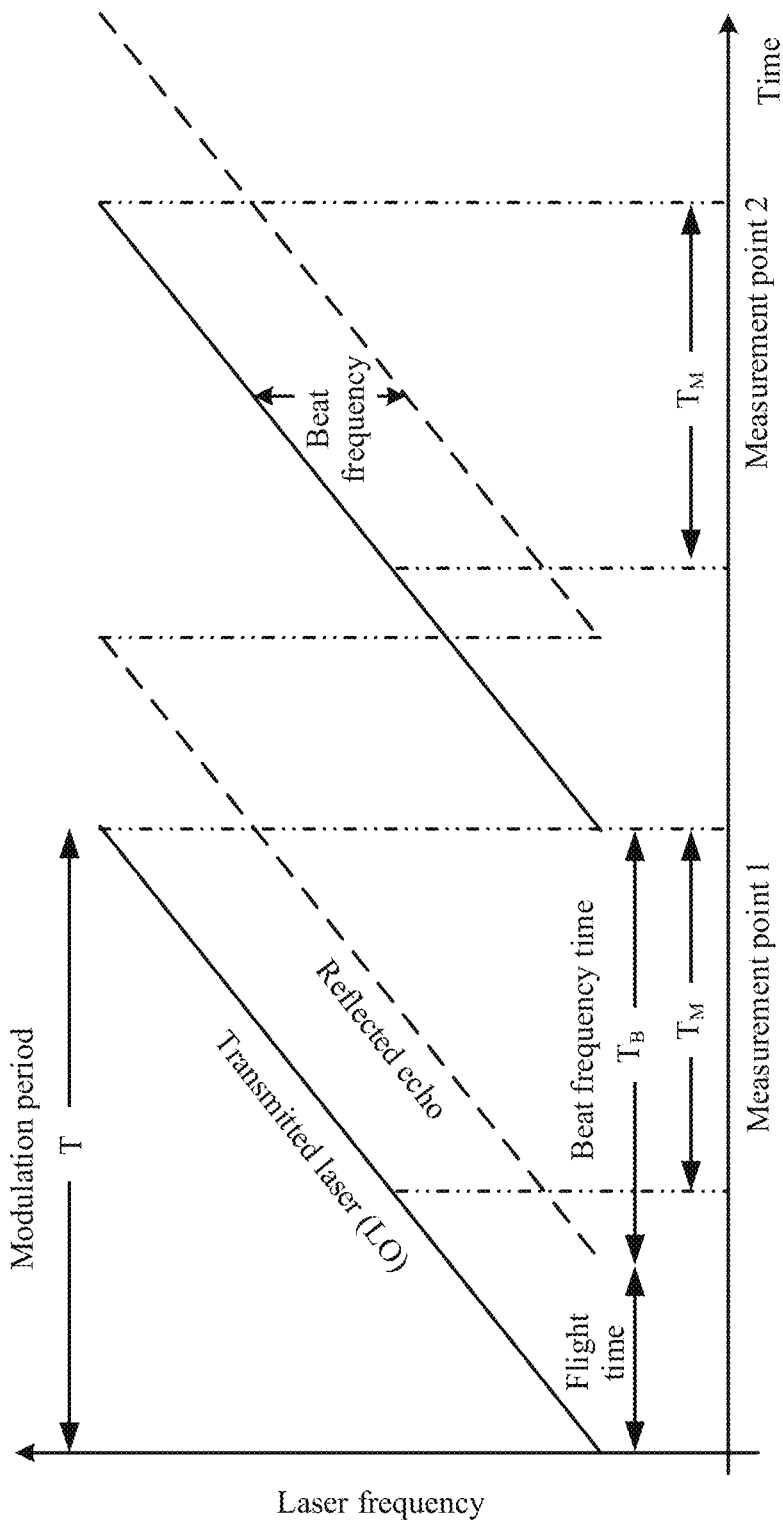
FIG. 7 is a schematic diagram of a beat frequency signal generated by a saw wave according to an embodiment of this disclosure.

A common linear frequency modulation coherent signal processing method for saw wave is shown in FIG. 7. A time remaining after a flight time corresponding to a farthest detection distance is subtracted from a modulation period T is used as a beat frequency time TB, data in the beat frequency time TB is collected, Fourier transform is performed on the data to obtain a frequency of a real-time beat frequency signal, and then a distance of the target object is calculated based on the frequency. In this case, a measurement time TM of each measurement point is less than or equal to TB. Further, if other measurement channels with different linear frequency modulation slopes are used in combination, a speed of the target object can be obtained.

Figure 8:
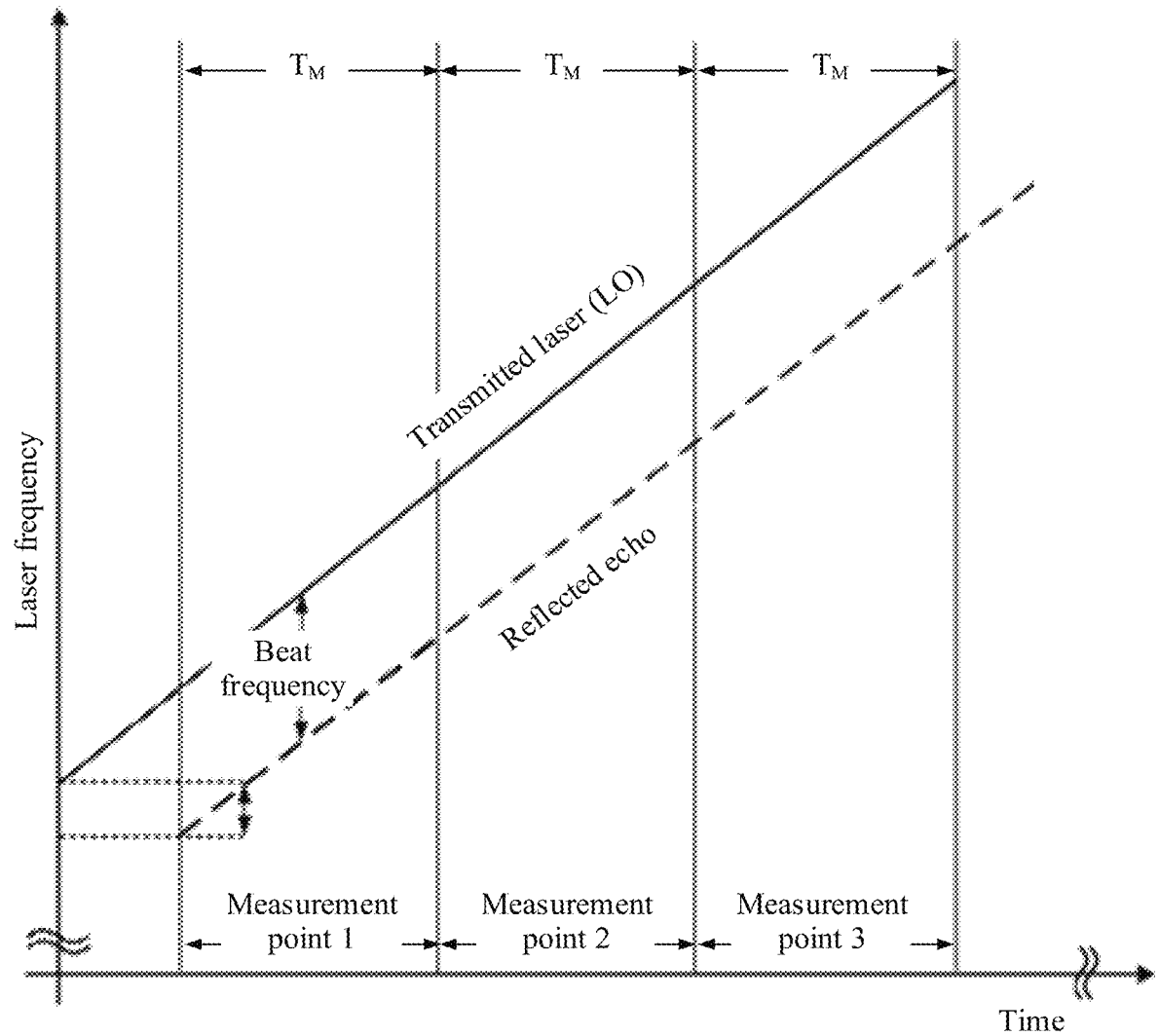
FIG. 8 is a schematic diagram of division of a beat frequency time according to an embodiment of this disclosure.

To improve a point output rate of the laser radar, a plurality of MUs may be divided in a single beat frequency time. As shown in FIG. 8, a beat frequency time is divided into three segments, to obtain three MUs (corresponding to three measurement points), and one detection may be completed based on a signal of each MU. In this way, the point output rate is three times an original point output rate, and the beat frequency time of each MU is ⅓ of an original beat frequency time.

Figure 9:
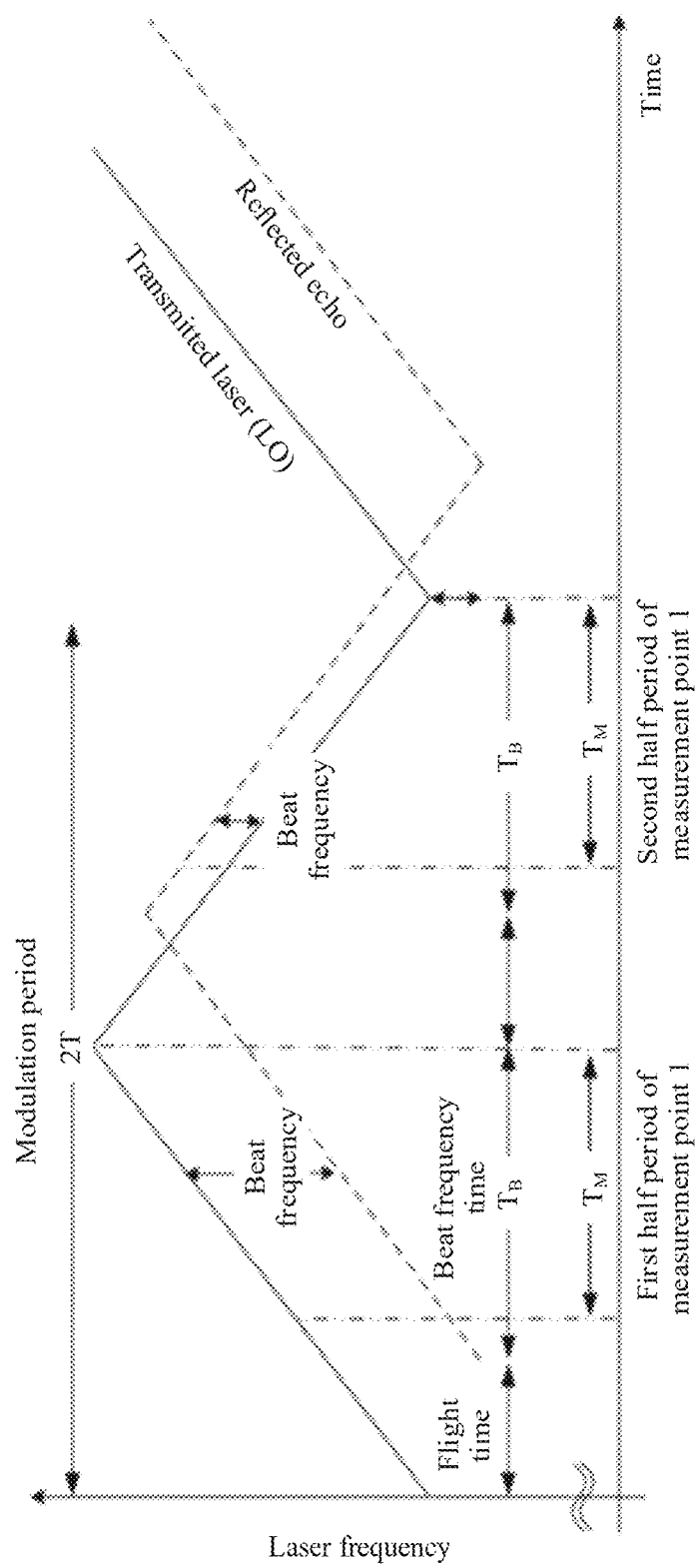
FIG. 9 is a schematic diagram of linear frequency modulation coherent digital signal processing of a triangle wave according to an embodiment of this disclosure.

A common linear frequency modulation coherent signal processing method for triangle wave is shown in FIG. 9. A flight time and a beat frequency time are respectively divided in a positive slope modulation period and a negative slope modulation period. A signal processing manner in each beat frequency time is the same as the linear frequency modulation coherent signal processing method for saw wave. In a first half period (which may also be described as a first half period corresponding to a measurement point) of the MU, a beat frequency $f_1$ is obtained through processing, and in a second half period (which may also be described as a second half period corresponding to the measurement point) of the MU, a beat frequency $f_2$ is obtained through processing, so that distance information and speed information of a target can be obtained with one measurement channel.

Figure 10:
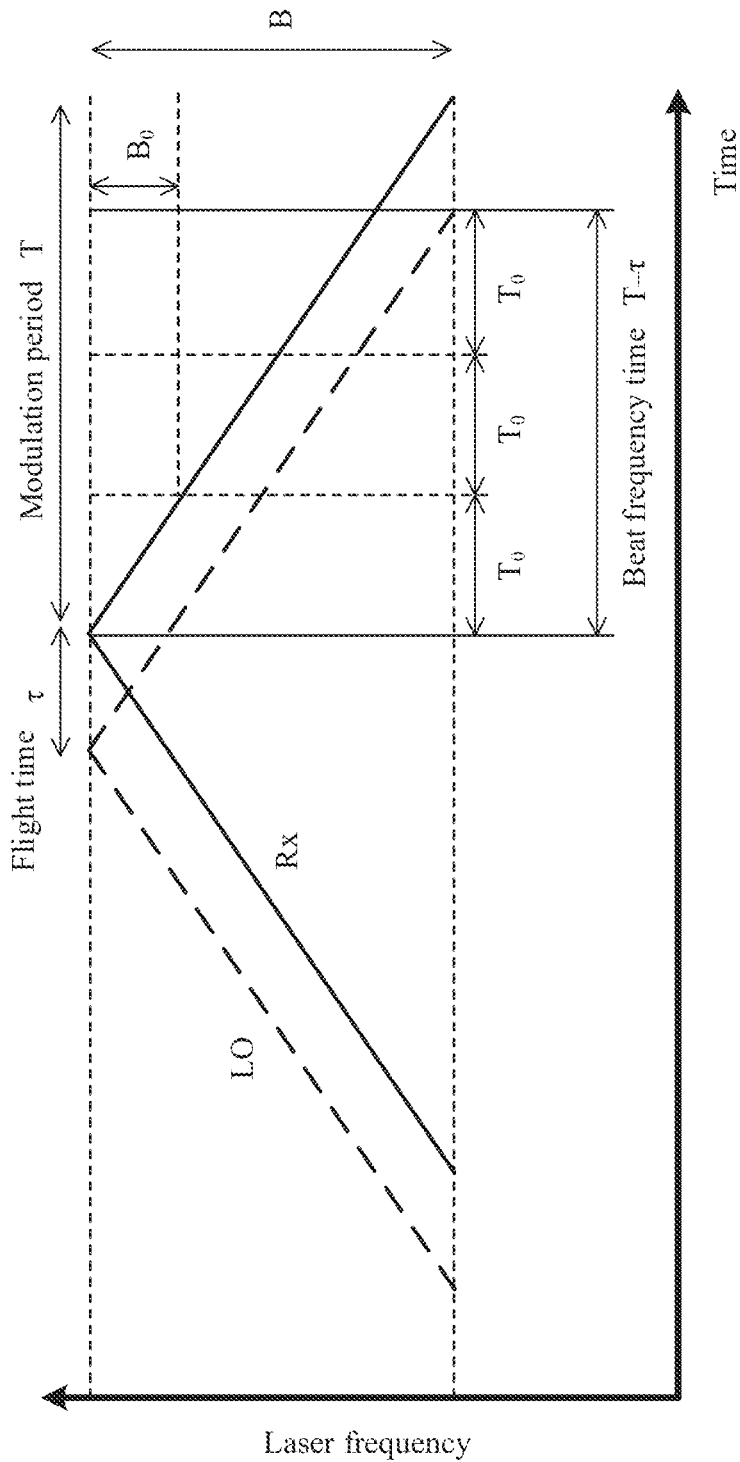
FIG. 10 is a schematic diagram of division of a beat frequency time according to an embodiment of this disclosure.

To improve a point output rate of a laser radar, a beat frequency time in a positive slope period and a negative slope period may be divided into a plurality of measurement times. As shown in FIG. 10, a beat frequency time T_τ in a negative slope period is divided into three measurement times $T_0$ respectively corresponding to three MUs. Based on each MU, detection can be completed once. Therefore, the point output rate is three times an original point output rate, and the beat frequency time of each MU is ⅓ of an original beat frequency time.

It can be learned that, in the foregoing manner of improving a point output rate, a beat frequency time of each MU is reduced, and energy accumulation of a useful signal during time-frequency transform is reduced, so that a signal-to-noise ratio of measurement is affected and a detection distance of coherent measurement is reduced.

To ensure a high point output rate and a high signal-to-noise ratio, an embodiment of this disclosure provides the method shown in FIG. 11.

Refer to FIG. 11. FIG. 11 shows a radar detection method according to an embodiment of this disclosure. The method may be implemented based on components in the laser radar system shown in FIG. 5. Some operations in subsequent descriptions are completed by a signal processing apparatus, and the signal processing apparatus may be the foregoing processor 512, or an apparatus in which the foregoing processor 512 is deployed, for example, a laser radar system in which the foregoing processor 5123 is deployed or a module in the laser radar system. The method includes but is not limited to the following steps.

Step S1101: The signal processing apparatus transforms a beat frequency signal of a radar into a two-dimensional spectrogram.

In other words, in this disclosure, not only frequency domain information of the beat frequency signal is obtained, but also time domain information of the beat frequency signal is obtained. Therefore, after transform, frequency domain information with a smaller granularity from a perspective of time domain may be obtained. The transform may be a two-dimensional time-frequency transform. A time domain length of each segment of signal processed by the two-dimensional time-frequency transform is 1/N of a frequency modulation period of the radar (which may also be usually referred to as a frequency modulation period of a laser signal, or referred to as a frequency modulation period of a laser, or referred to as a time domain length of an upper and lower chirp (chirp signal) pair), where N is greater than or equal to 2. That is, frequency domain information with a granularity of 1/N of the frequency modulation period of the radar from a perspective of time domain is obtained.

Optionally, the two-dimensional time-frequency transform may be a short-time Fourier transform. In this case, performing two-dimensional time-frequency transform on the beat frequency signal of the radar to obtain the two-dimensional spectrogram may further include the following steps.

First, the beat frequency signal is divided in time domain to obtain a plurality of segments of sub-signals, where a time domain length of each segment of sub-signal is 1/N of the frequency modulation period of the radar. FIG. 12 shows a segment of beat frequency signal. A horizontal axis represents time domain information of the beat frequency signal, and a vertical axis represents amplitude information of the beat frequency signal. A time domain length of the segment of beat frequency signal in FIG. 12 is 6 microseconds (s). A vertical line in FIG. 12 shows a division status of the 6-microsecond beat frequency signal.

For example, if a beat frequency signal sequence obtained through ADC sampling has 20000 sampling points, which are denoted as s(n), where 0≤n≤20000, s(n) may be divided, every 200 sampling points are divided into one group, 100 groups may be obtained through division, that is, 100 segments of sub-signals. A time occupied by each group may be referred to as one slot (slot). Therefore, a total quantity of slots is $N_{slot}$=100. An expression of an $l^{th}$ segment of beat frequency signal s/(n) obtained through division may be:

$$s_l(n)=s[(l-1)*200+n],\ 0\le n<200,\ 0\le l<100$$

l is a sequence number of a segment, and n is a sequence number of a sampling point.

Figure 13:
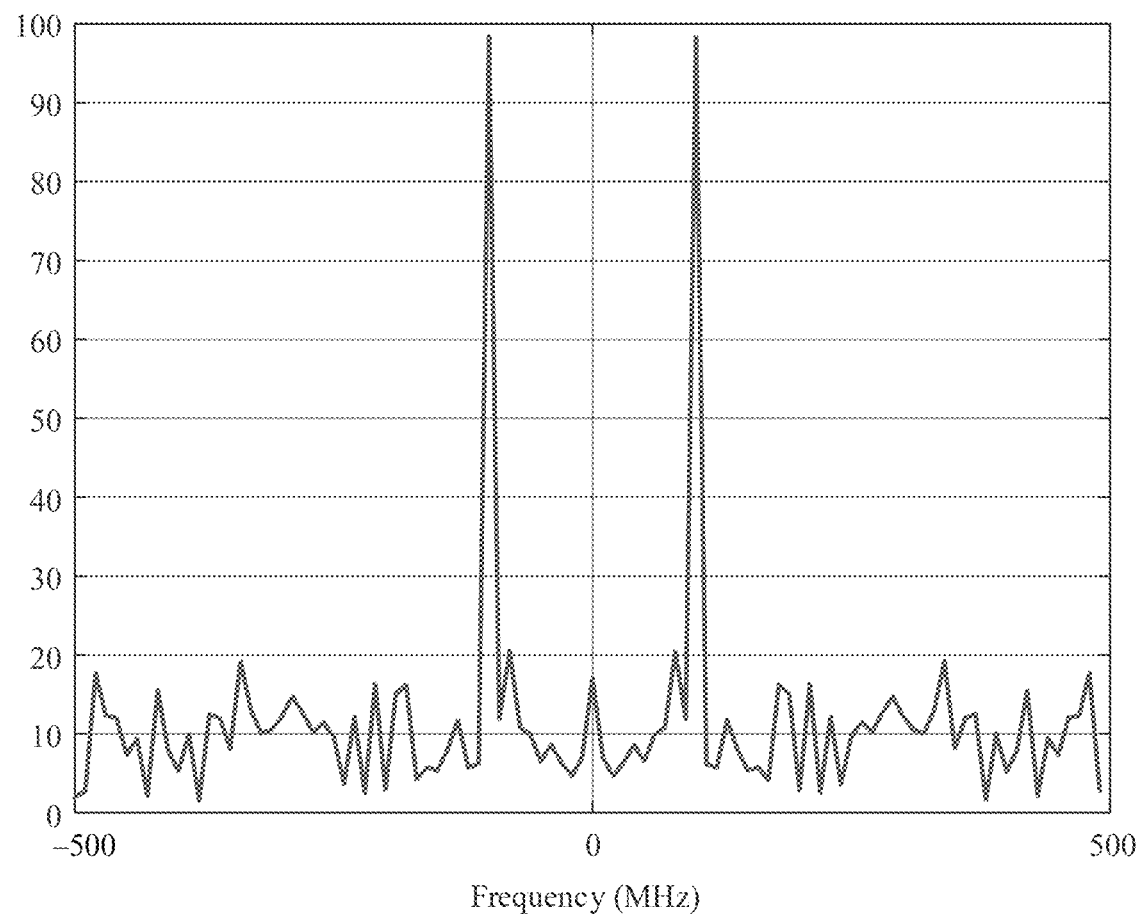
FIG. 13 is a schematic diagram of a time frequency signal after two-dimensional time-frequency transform according to an embodiment of this disclosure.

Then, fast Fourier transform (FFT) is separately performed on the plurality of segments of sub-signals to obtain frequency domain information of each of the plurality of segments of sub-signals. FIG. 13 shows information about a segment of sub-signal. For information about other sub-signals, refer to the sub-signal. For example, if information about 100 segments of sub-signals is obtained based on the foregoing description, FFT calculation can be performed 100 times, to obtain 100 segments of frequency domain information. A quantity of sampling points corresponding to each segment of frequency domain information is $N_{fft}$=200.

Optionally, an expression of FFT when FFT calculation is performed may be:

$$S_l(k) = \sum_0^{199} s_l(n) e^{-\frac{j2\pi kn}{200}},\ 0 \le k < 200$$

F[ ] represents an FFT operation, and k is a sequence number of a frequency domain sequence (representing different frequencies).

Then, the two-dimensional spectrogram is generated based on the frequency domain information of each of the plurality of segments of sub-signals.

Figure 14:
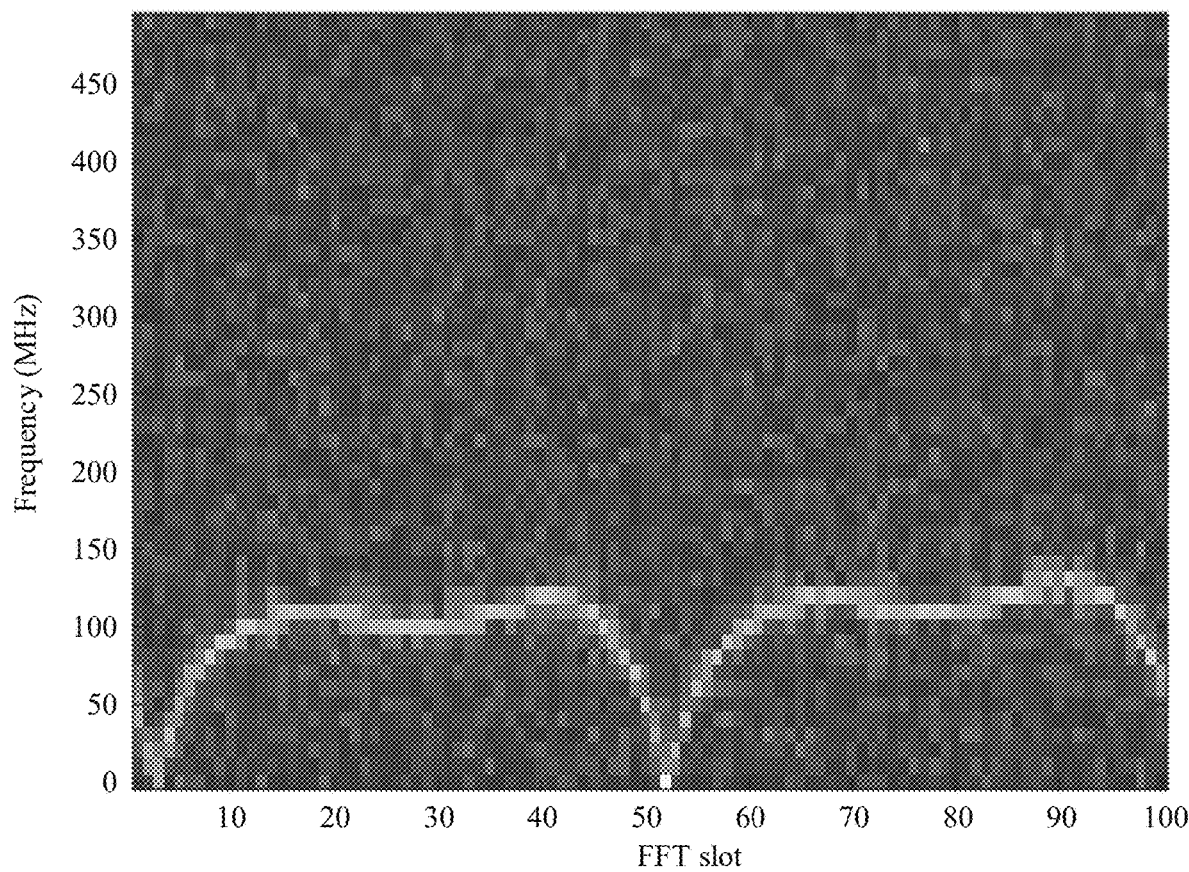
FIG. 14 is a schematic diagram of a two-dimensional spectrogram according to an embodiment of this disclosure.

Further, because each segment of sub-signal is obtained through division based on time domain, each segment of sub-signal corresponds to one piece of time domain information. Because frequency domain information of each segment of sub-signal is obtained through Fourier transform, in this step, time domain information and frequency domain information of each segment of sub-signal are obtained. Therefore, information of each segment of sub-signal may be stored according to a corresponding rule, for example, stored by using a table T with a specification of $N_{fft}*N_{slot}$. In this case, the table T may be considered as the two-dimensional spectrogram of the beat frequency signal of the radar. FIG. 14 shows a two-dimensional spectrogram, where a horizontal axis represents time domain information, and a vertical axis represents frequency domain information. Because a luminance difference cannot be shown in the figure, a manner of indicating a frequency amplitude by using luminance in an experiment cannot be seen from FIG. 14. However, in experimental simulation and actual application, amplitude information may be represented by using luminance in a two-dimensional spectrogram. Therefore, the two-dimensional spectrogram may be obtained by combining each segment of sub-signal and the frequency domain information.

It should be noted that, after two-dimensional time-frequency transformation is performed on the positive slope part in the beat frequency signal, the positive slope part is usually above the horizontal axis in FIG. 14, and after two-dimensional time-frequency transformation is performed on the negative slope part in the beat frequency signal, the negative slope part is usually below the horizontal axis in FIG. 14. However, for ease of operation, a band below the horizontal axis is usually mirrored to a band above the horizontal axis. Therefore, an effect finally seen in FIG. 14 is that all bands are above the horizontal axis, and a second waveform in FIG. 14 is a band mirrored above the horizontal axis. In addition, there seems to be only two bands shown in FIG. 14, but actually, there may be more bands, for example, four bands, or six bands.

Step S1102: The signal processing apparatus intercepts, based on a time domain sliding step, a plurality of MUs whose time domain lengths are equal to the frequency modulation period of the radar from the two-dimensional spectrogram.

The time domain sliding step is preset according to a requirement. If a point cloud density of the radar is expected to be high, that is, a point output rate is expected to be high, the time domain sliding step may be set to a smaller value. For example, a length of the time domain sliding step may be set to be less than the frequency modulation period of the radar.

In the conventional technology, on average, one measurement point is obtained in one frequency modulation period of one radar. If it is expected that a point cloud density is increased by R times, R measurement points can be obtained on average in one frequency modulation period of a radar. Therefore, R may be introduced to calculate a time domain sliding step, and R may be interpreted as an expected radar point cloud density improvement multiple, or interpreted as a quantity of measurements that can be completed in one frequency modulation period of the radar. After R is introduced, the time domain sliding step d0 is calculated as follows:

Case: An initial value d is first calculated by using a formula d=$T_{chirp}$/R, and then rounding is performed on d to obtain d0, where a unit of $T_{chirp}$ may be second, millisecond, microsecond, slot, or the like. It may be understood that when the unit of $T_{chirp}$ is slot, $T_{chirp}$ is equal to the foregoing $N_{slot}$. In addition, when rounding is performed on d, a rounding algorithm may be rounding down, rounding up, rounding off, or rounding in another manner. This is not limited herein.

Figure 15:
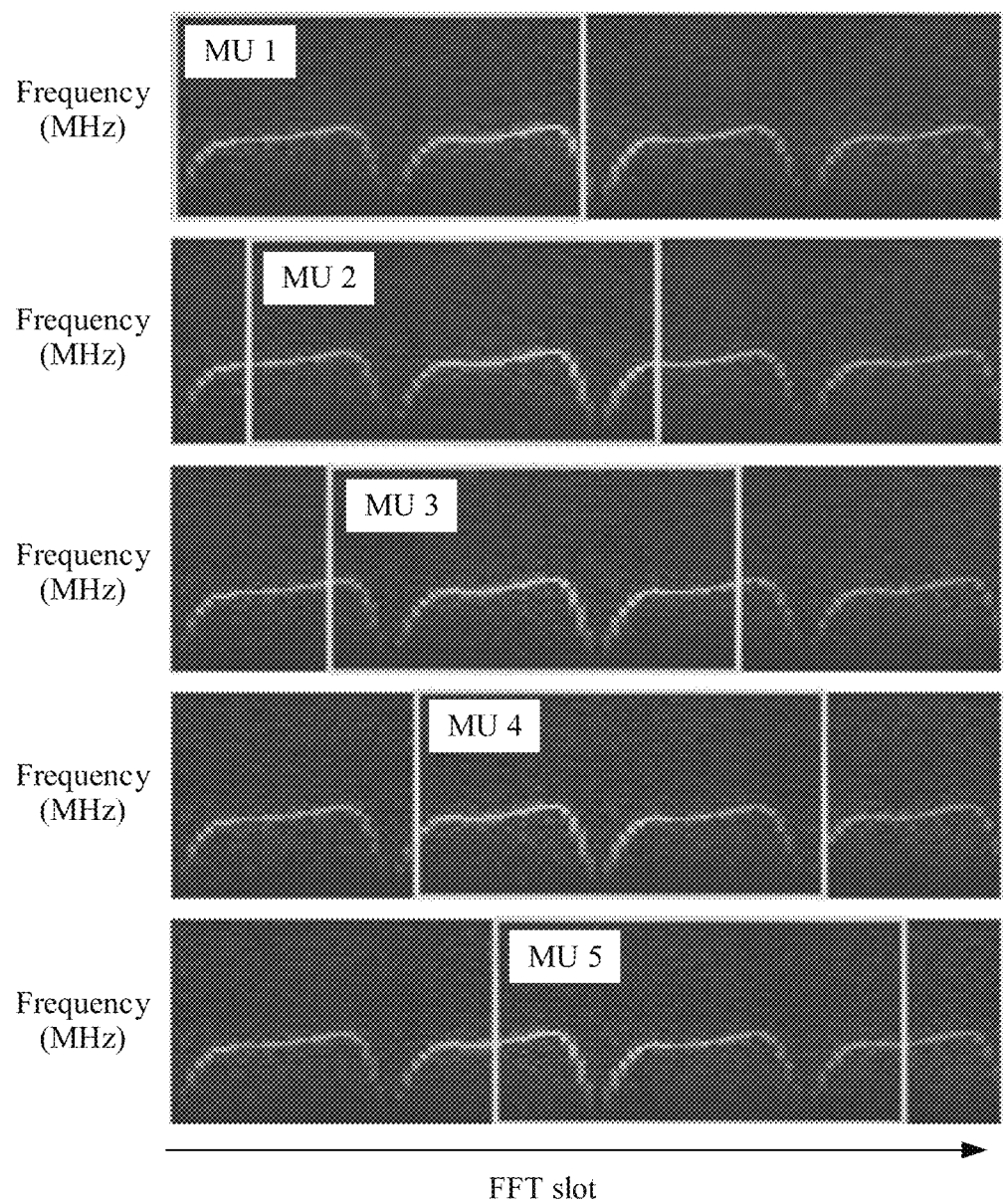
FIG. 15 is a schematic diagram of a scenario of intercepting a two-dimensional spectrogram according to an embodiment of this disclosure.

After the time domain sliding step is determined, the MU is intercepted from the previously obtained two-dimensional spectrogram. Optionally, the time domain length of each MU is equal to the frequency modulation period of the radar. A manner of interception is intercepting based on a time domain sliding step. A time-frequency range of a $k^{th}$ intercepted MU is a sliding of an interception range of a $(k-1)^{th}$ MU. As shown in FIG. 15, interception is performed from left to right in sequence (time increases from left to right). After a first MU 1 is intercepted, a time domain sliding step is slid rightwards in time domain, and then a second interception is performed to obtain a second MU 2. The rest may be deduced by analogy. As shown in FIG. 15, R is equal to 5, and finally five MUs are intercepted, which are MU 1, MU 2, MU 3, MU 4, and MU 5 sequentially. A difference of time-domain start points between any two adjacent MUs in time domain is the time-domain sliding step, and time-domain start points of MU 1, MU 2, MU 3, MU 4, and MU 5 are all in a same frequency modulation period of the radar.

In the case shown in FIG. 15, although some bands are incomplete, after splicing, a complete band corresponding to a beat frequency signal with a positive slope and a complete band corresponding to a beat frequency signal with a negative slope may be obtained. For example, the MU 2 spans three bands, a second band is complete, and corresponds to a beat frequency signal with a negative slope. However, a first band and a third band are incomplete. In this case, a tail of the first band and a head of the third band may be spliced to obtain a complete band, and the complete band corresponds to a beat signal with a positive slope.

Optionally, in addition to being a fixed value, the time domain sliding step may not be a fixed value. For example, a step of a first sliding is different from a step of a second sliding, and the step of the second sliding is different from a step of a third sliding. Usually, a sliding step may also be described as a slide step, and is used to indicate a sliding length.

It may be understood that, if an interception is performed based on a time domain sliding step, usually, a plurality of MUs may be captured.

Step S1103: The signal processing apparatus determines a radar detection result based on each of the plurality of MUs.

Further, the radar detection result may include one or more of distance information and speed information, and certainly may further include other information.

In this embodiment of this disclosure, there are many manners of determining the radar detection result based on the intercepted MUs.

For example, the radar detection result is calculated based on frequency information in the MUs. Because an MU includes a positive slope part of the beat frequency signal and a negative slope part of the beat frequency signal, and the positive slope part in the beat frequency signal and the negative slope part in the beat frequency signal are strongly correlated with a distance (a distance from the target object to the radar) and a speed (a moving speed of the target object), information such as distance information and/or speed information may be obtained through calculation based on the MU.

For another example, a reference spectrum with a highest similarity is found from a spectrum library for each intercepted MU through matching, and then detection information corresponding to the reference spectrum with the highest similarity of each MU is used as a radar detection result of each MU. A plurality of reference spectrums is recorded in the spectrum library, each reference spectrum corresponds to detection information, and the detection information includes one or more of distance information or speed information. Detection information corresponding to each reference spectrum in the spectrum library is pre-calculated and stored.

Figure 16:
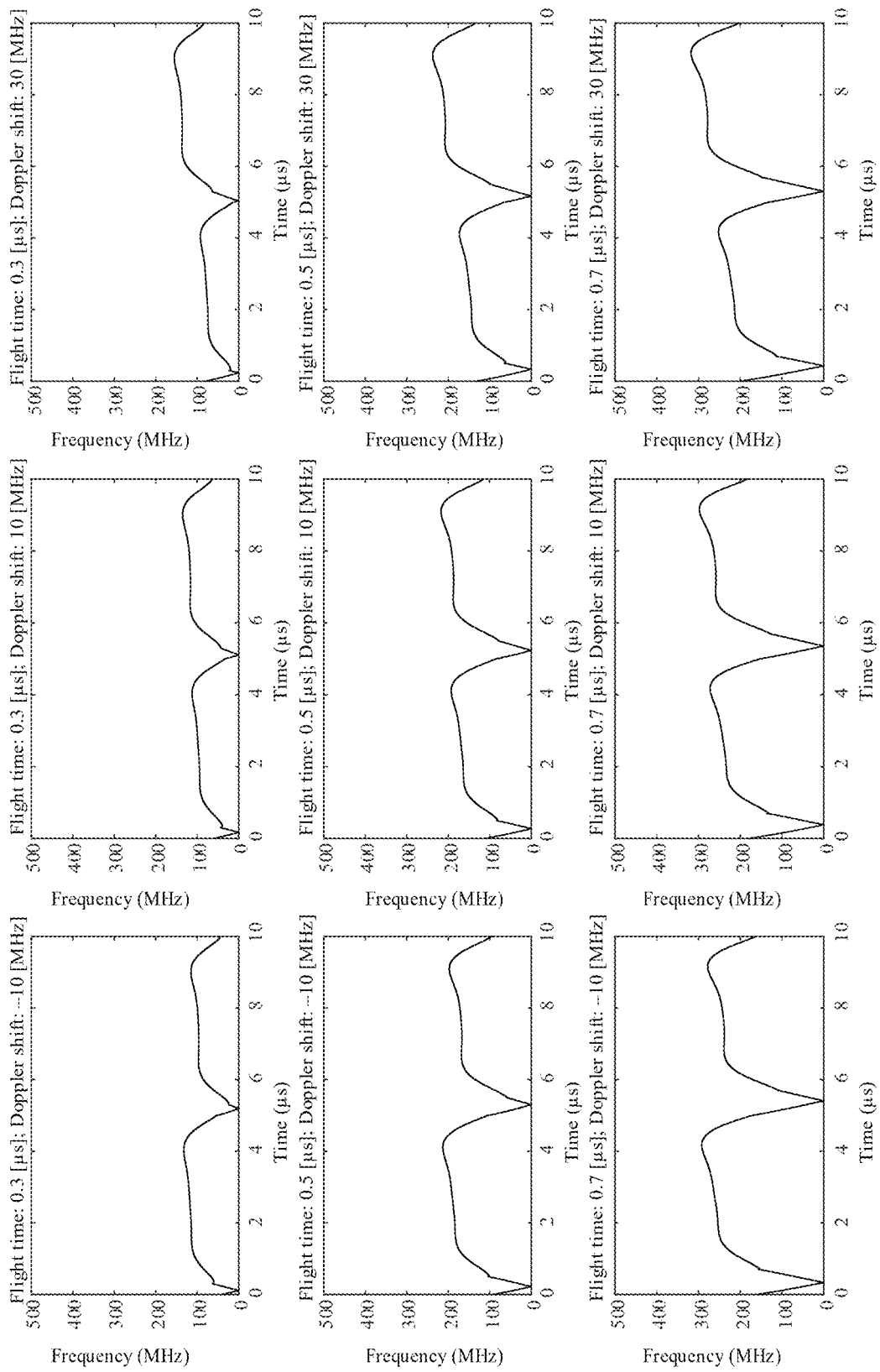
FIG. 16 is a schematic diagram of a scenario of reference spectrums according to an embodiment of this disclosure.

A radar may obtain a spectrum through simulation or experiment in a case of a specific Doppler spectrum (corresponding to a specific moving speed) and a specific flight time (corresponding to a specific distance) of a laser signal. Therefore, a plurality of spectrums may be obtained with different Doppler spectrums and flight times. One of the spectrums is used as an example, a first half of the spectrum corresponds to a positive slope part in a beat frequency signal, and a second half of the spectrum corresponds to a negative slope part in the beat frequency signal. The second half of the spectrum usually has a negative value, so after the second half of the spectrum is mirrored to have a positive value, both the first half and the second half have positive values. A spectrum obtained after mirroring processing is the reference spectrum mentioned in this embodiment of this disclosure, and a specific Doppler spectrum (or a specific speed) and a specific flight time (or a specific distance) that are used above are detection information corresponding to the reference spectrum. FIG. 16 is a schematic diagram of reference spectrums obtained after a mirroring operation is performed on nine spectrums.

Optionally, the following enumerates an optional method for generating a spectrum library.

Step 1: Generate one reference spectrum based on one Doppler shift and one signal flight time.

Figure 1:
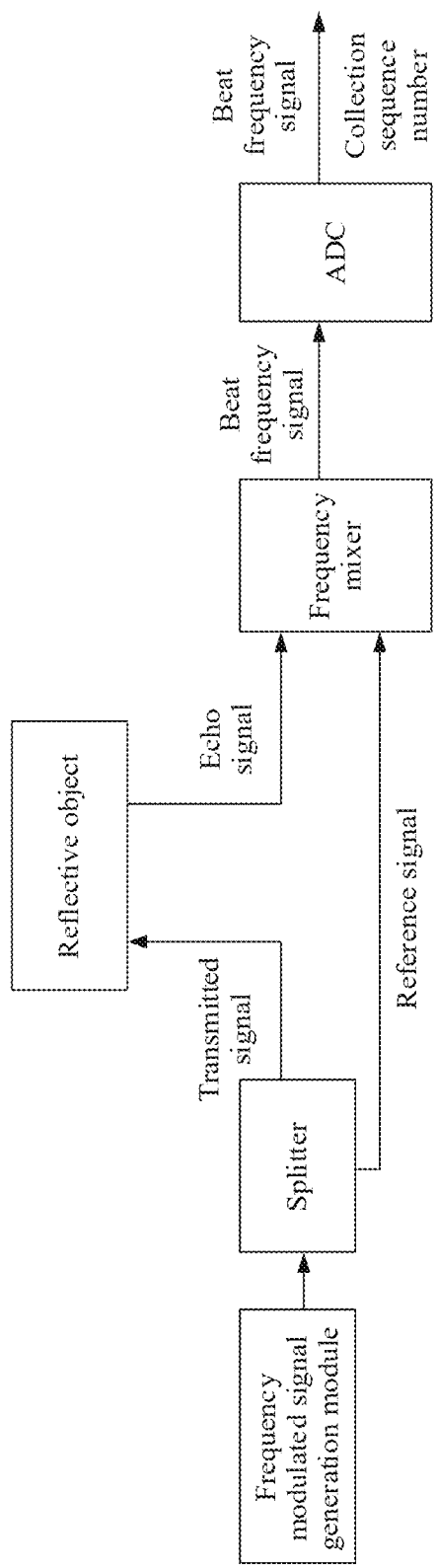
FIG. 1 is a schematic diagram of a principle of a laser radar according to an embodiment of this disclosure.
Figure 2:
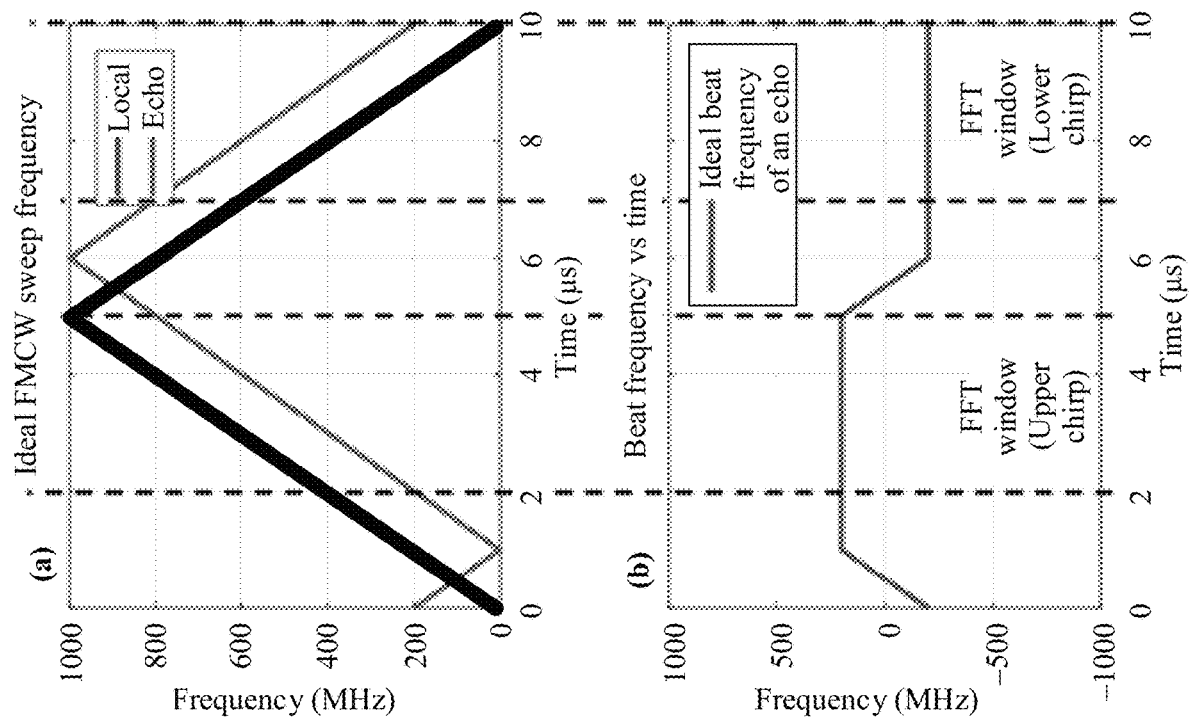
FIG. 2 is a schematic diagram of a beat frequency signal according to an embodiment of this disclosure.
Figure 3:
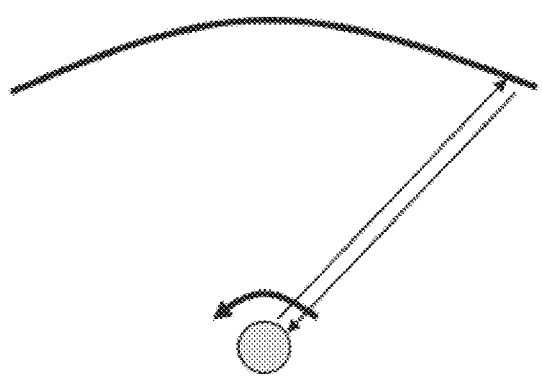
FIG. 3 is a schematic diagram of deflection during laser scanning according to an embodiment of this disclosure.
Figure 4:
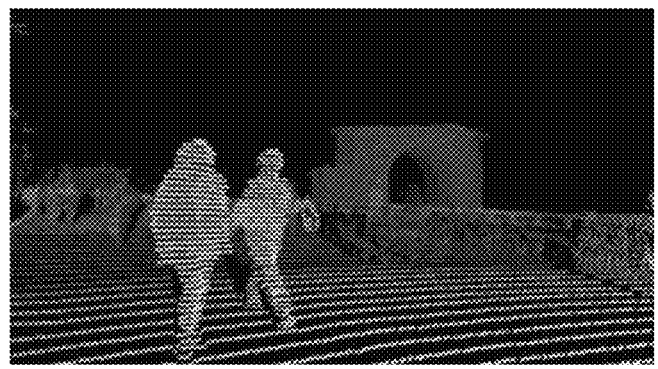
FIG. 4 is a schematic diagram of an effect of a point cloud according to an embodiment of this disclosure.

The Doppler shift herein corresponds to a moving speed (that is, the specific speed mentioned above), and the signal flight time herein corresponds to a distance (that is, the specific distance mentioned above). Two-dimensional spectrograms of corresponding beat frequency signals after combination of different Doppler shifts and different signal flight times are different. It is assumed that a frequency sweep curve of the radar laser is obtained, and is denoted as $f_{est}(t)$. The frequency sweep curve is a curve in which the frequency of the FMCW laser changes with time, as shown in part (a) of FIG. 2. A manner of obtaining the frequency sweep curve may be offline measurement or online measurement. This is not limited in this disclosure.

In this case, two-dimensional spectrograms of the beat frequency signal under different [Doppler, flight time] combinations may be estimated based on the frequency sweep curve. For example, for a specific Doppler spectrum and flight time $[f_d, \tau]$, an expression of a two-dimensional spectrogram may be estimated as:

$$f_{best}(t,\tau,f_d)f_{est}(t)-[f_{est}(t-\tau)+f_d]$$

$\tau$ is the flight time, $f_d$ is the Doppler shift, and $f_{best}(t,\tau,f_d)$ is a curve of a beat frequency over time. When $[f_d, \tau]$ is determined, $f_{best}(t, \tau, f_d)$ is a determined two-dimensional spectrogram. Then, mirror processing is performed on a beat frequency of a negative slope part in the two-dimensional spectrogram, to obtain the foregoing reference spectrum.

Step 2: Use one piece of speed information and one piece of distance information as detection information corresponding to the one reference spectrum, and save the speed information and the distance information in the spectrum library, where the one piece of speed information is the one Doppler shift, or is a moving speed of a reflective object corresponding to the one Doppler shift, and the one piece of distance information is the one signal flight time or a distance of a reflective object (also referred to as a target object) corresponding to the one signal flight time.

After step 1 and step 2 are completed for a plurality of pairs of Doppler shifts and signal flight times, the spectrum library including a plurality of reference spectrums may be obtained. Optionally, the spectrum library may update, for example, delete or add a reference spectrum.

Optionally, the following enumerates an optional method for finding a reference spectrum with a highest similarity through matching.

For a plurality of reference spectrums in the spectrum library, that is, some reference spectrums estimated based on the Doppler spectrum and flight time, which are recorded as $f_{best}(t, \tau, f_d)$, which reference spectrum in the spectrum library is most similar to the MU intercepted in step S1102 can be determined through comparison subsequently. A target MU may be represented as follows: using an example in which $N_{chirp}$ is equal to $N_{slot}$, the MU is denoted as a two-dimensional matrix T(l,k), where $0 \le l < N_{slot}$, l is a time sequence number, $N_{slot}$ is a quantity of slots (slot) of a beat frequency signal during division, $0 \le k < N_{fft}$, k is a frequency sequence number, and $N_{fft}$ is a quantity of FFT points.

A time resolution of T(l,k) is recorded as $\Delta t$, and a frequency resolution is recorded as $\Delta f$. The time resolution is duration of each slot, and the frequency resolution is a frequency interval of FFT. There is the following relationship: $\Delta f = 1/\Delta t$.

In this case, for l in T(l,k), a corresponding time length is $l \cdot \Delta t$.

Then, for different beat frequency curves $f_{best}(t, \tau, f_d)$, a frequency corresponding to each l is calculated, that is, $f_{best}(l \cdot \Delta t, \tau, f_d)$.

Then, $f_{best}(l \cdot \Delta t, \tau, f_d)$ is converted to an integer multiple of the frequency resolution $\Delta f$, that is:

$$k_{l,\tau,fd} = \text{round}(f_{best}(l \cdot \Delta t, \tau, fd)/\Delta f)$$

Then, each reference spectrum in the spectrum library is substituted into the following formula to obtain a matching degree value $M_{rf}(\tau, f_d)$ (that is, a similarity):

$$M_{rf}(\tau, f_d) = \Sigma_{r=0}^{Nslot} T(l, k_{l,\tau,fd})$$

If $M_{rf}(\tau, f_d)$ obtained through calculation after a reference spectrum is substituted into the formula is the largest, it is considered that a similarity between the reference spectrum and the target MU is the highest. Therefore, $[f_d, \tau]$ in the reference spectrum is used as the radar detection result of the target MU, and a formula is expressed as follows:

$$[\tau_{est}, f_{est}] = \text{argmax } M_{rf}(\tau, f_d)$$

Based on a principle of calculating the radar detection result of the target MU, a detection result of each intercepted MU can be calculated.

In the method shown in FIG. 11, a beat frequency signal is transformed to obtain a frequency domain signal of a smaller granularity in time domain, and then MUs are intercepted on the frequency domain signal of the smaller granularity in a sliding window manner. Because the sliding window interception is performed on the frequency domain signal of the smaller granularity, even if some intercepted MUs share a frequency band, a difference between different MUs can still be distinguished due to the small granularity of the frequency domain signal. In addition, because a length of a time domain sliding step in time domain is less than the frequency modulation period of the radar, any two adjacent MUs in time domain share a part of frequency information. Therefore, even if a large quantity of MUs are intercepted, it can still be ensured that sufficient signal energy is accumulated in each MU, to ensure a signal-to-noise ratio. Therefore, in this manner, the point output rate can be improved without lowering the signal-to-noise ratio or increasing costs significantly.

The foregoing describes in detail the method in embodiments of this disclosure, and the following provides an apparatus in embodiments of this disclosure.

Figure 17:
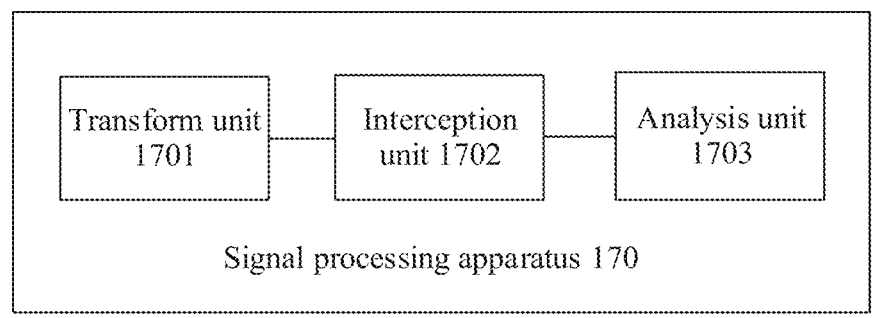
FIG. 17 is a schematic diagram of a structure of a signal processing apparatus according to an embodiment of this disclosure.

Refer to FIG. 17. FIG. 17 is a schematic diagram of a structure of a signal processing apparatus 170 according to an embodiment of this disclosure. The apparatus may be the foregoing laser radar system, or a processor in the laser radar system, or a related component used to deploy the processor in the laser radar system. The signal processing apparatus 170 may include a transform unit 1701, an interception unit 1702, and an analysis unit 1703. The following describes the units in details.

The transform unit 1701 is configured to transform a beat frequency signal of a radar into a two-dimensional spectrogram.

The interception unit 1702 is configured to intercept, based on a time domain sliding step, a plurality of MUs whose time domain lengths are equal to a frequency modulation period of the radar from the two-dimensional spectrogram, where a length of the time domain sliding step is less than the frequency modulation period of the radar.

The analysis unit 1703 is configured to determine a radar detection result based on each of the plurality of MUs.

In the foregoing method, a beat frequency signal is transformed to obtain a frequency domain signal of a smaller granularity in time domain, and then MUs are intercepted on the frequency domain signal of the smaller granularity in a sliding window manner. Because the sliding window interception is performed on the frequency domain signal of the smaller granularity, even if some intercepted MUs share a frequency band, a difference between different MUs can still be distinguished due to the small granularity of the frequency domain signal. In addition, because a length of a time domain sliding step in time domain is less than the frequency modulation period of the radar, any two adjacent MUs in time domain share a part of frequency information. Therefore, even if a large quantity of MUs are intercepted, it can still be ensured that sufficient signal energy is accumulated in each MU, to ensure a signal-to-noise ratio. Therefore, in this manner, the point output rate can be improved without lowering the signal-to-noise ratio or increasing costs significantly.

Optionally, the transform unit 1701 is further configured to: divide the beat frequency signal in time domain to obtain a plurality of segments of sub-signals, where a time domain length of each segment of sub-signal is 1/N of the frequency modulation period of the radar, and N is greater than or equal to 2; separately perform Fourier transform on the plurality of segments of sub-signals to obtain frequency domain information of each of the plurality of segments of sub-signals; and generate the two-dimensional spectrogram based on the frequency domain information of each segment of sub-signal.

Optionally, the interception unit 1702 is further configured to: find, from a spectrum library through matching, a reference spectrum with a highest similarity for each MU, where the spectrum library records a plurality of reference spectrums, each reference spectrum corresponds to detection information, and the detection information includes at least one of distance information or speed information; and use detection information corresponding to the reference spectrum with the highest similarity of each MU as the radar detection result of each MU.

In the foregoing method, a reference spectrum that is closest to an MU and for which detection information is calculated is found from a spectrum library through matching, and then the detection information of the reference spectrum that is closest to the MU is used as a detection result of the MU instead of being calculated in real time. This significantly reduces a speed of determining a detection result of the MU at a single time, and effectively balances a computing pressure caused by an increase of the point output rate.

Optionally, the apparatus further includes: a generation unit, configured to generate one reference spectrum based on one Doppler shift and one signal flight time; and a saving unit, configured to use one piece of speed information and one piece of distance information as detection information corresponding to the one reference spectrum, and save the speed information and the distance information in the spectrum library, where the one piece of speed information is the one Doppler shift or a moving speed of a reflective object corresponding to the one Doppler shift, and the one piece of distance information is the one signal flight time or a distance of a reflective object corresponding to the one signal flight time.

Optionally, the time domain sliding step d is obtained by performing a rounding operation on d0, and d0 meets the following relationship:

$$d0=T_{chirp}/R$$

$T_{chirp}$ is the frequency modulation period of the radar, and R is an expected radar point cloud density improvement multiple.

It can be learned that a point cloud density can be adjusted to an expected density by configuring R, which is flexible and easy to implement.

It should be noted that for implementation of the units, refer to the corresponding descriptions in the method embodiment shown in FIG. 11. The foregoing units may be implemented by using software, hardware, or a combination thereof. The hardware may be the foregoing processor, and the software may include driver code running on the processor. This is not limited in this embodiment.

An embodiment of this disclosure further provides a chip system. The chip system includes at least one processor, a memory, and an interface circuit. The memory, the interface circuit, and the at least one processor are interconnected through lines, and the at least one memory stores instructions. When the instructions are executed by the processor, the method procedure shown in FIG. 11 is implemented.

An embodiment of this disclosure further provides a computer-readable storage medium. The computer-readable storage medium stores instructions, and when the instructions are run on a processor, the method procedure shown in FIG. 11 is implemented.

An embodiment of this disclosure further provides a computer program product. When the computer program product is run on a processor, the method procedure shown in FIG. 11 is implemented.

In conclusion, a beat frequency signal is transformed to obtain a frequency domain signal of a smaller granularity in time domain, and then MUs are intercepted on the frequency domain signal of the smaller granularity in a sliding window manner. Because the sliding window interception is performed on the frequency domain signal of the smaller granularity, even if some intercepted MUs share a frequency band, a difference between different MUs can still be distinguished due to the small granularity of the frequency domain signal. In addition, because a length of a time domain sliding step in time domain is less than the frequency modulation period of the radar, any two adjacent MUs in time domain share a part of frequency information. Therefore, even if a large quantity of MUs are intercepted, it can still be ensured that robust signal energy is accumulated in each MU, to ensure a signal-to-noise ratio. Therefore, in this manner, the point output rate can be improved without lowering the signal-to-noise ratio or increasing costs significantly.

A person of ordinary skill in the art may understand that all or some of the procedures of the methods in embodiments may be implemented by a computer program instructing related hardware. The program may be stored in a computer-readable storage medium. When the program is run, the procedures of the methods in embodiments are performed. The foregoing storage medium includes: any medium that can store program code, such as a ROM or a random access memory RAM, a magnetic disk or an optical disc.

What is claimed is:

1. A radar detection method, comprising:
   transforming a beat frequency signal of a radar into a two-dimensional spectrogram by:
      dividing the beat frequency signal in a time domain to obtain a plurality of segments of sub-signals, wherein a time domain length of each segment of sub-signal is 1/N of a frequency modulation period of the radar, and wherein N is greater than or equal to 2;
      separately performing a Fourier transform on the plurality of segments of sub-signals to obtain frequency domain information of each of the plurality of segments of sub-signals; and
      generating the two-dimensional spectrogram based on the frequency domain information of each segment of sub-signal;
   intercepting, based on a time domain sliding step, a plurality of measurement units (MUs) whose time domain lengths are equal to the frequency modulation period of the radar from the two-dimensional spectrogram, wherein a length of the time domain sliding step is less than the frequency modulation period of the radar; and
   determining a radar detection result based on each of the plurality of MUs.

2. The radar detection method of claim 1, wherein determining the radar detection result based on each of the plurality of MUs comprises:
   finding, from a spectrum library through matching, a reference spectrum with a highest similarity for each MU, wherein the spectrum library records a plurality of reference spectrums, wherein each reference spectrum corresponds to detection information, and wherein the detection information comprises at least one of distance information or speed information; and
   setting the detection information corresponding to the reference spectrum with the highest similarity of each MU as the radar detection result of each MU.

3. The radar detection method of claim 2, wherein the detection information corresponding to each reference spectrum in the spectrum library is pre-calculated and stored.

4. The radar detection method of claim 2, wherein before finding the reference spectrum with the highest similarity for each MU, the radar detection method further comprises:
   generating one reference spectrum based on one Doppler shift and one signal flight time;

using one piece of the speed information and one piece of the distance information as the detection information corresponding to the one reference spectrum; and saving the speed information and the distance information in the spectrum library, wherein the one piece of the speed information is the one Doppler shift or a moving speed of a first reflective object corresponding to the one Doppler shift, and wherein the one piece of the distance information is the one signal flight time or a distance of a second reflective object corresponding to the one signal flight time.

5. The radar detection method of claim 1, further comprising obtaining the time domain sliding step by performing a rounding operation on d0, wherein d0 meets the following relationship:

$$d0 = \frac{T_{chirp}}{R},$$

wherein $T_{chirp}$ is the frequency modulation period of the radar, and wherein R is an expected radar point cloud density improvement multiple.

6. The radar detection method of claim 1, further comprising intercepting the plurality of MUs on a frequency domain signal of the two-dimensional spectrogram in a sliding window manner.

7. An apparatus, comprising:
a memory configured to store instructions; and
a processor coupled to the memory and configured to execute the instructions to cause the apparatus to:
transform a beat frequency signal of a radar into a two-dimensional spectrogram by:
dividing the beat frequency signal in a time domain to obtain a plurality of segments of sub-signals, wherein a time domain length of each segment of sub-signal is 1/N of a frequency modulation period of the radar, and wherein N is greater than or equal to 2;
separately performing a Fourier transform on the plurality of segments of sub-signals to obtain frequency domain information of each of the plurality of segments of sub-signals; and
generating the two-dimensional spectrogram based on the frequency domain information of each segment of sub-signal;
intercept, based on a time domain sliding step, a plurality of measurement units (MUs) whose time domain lengths are equal to the frequency modulation period of the radar from the two-dimensional spectrogram, wherein a length of the time domain sliding step is less than the frequency modulation period of the radar; and
determine a radar detection result based on each of the plurality of MUs.

8. The apparatus of claim 7, wherein the processor is further configured to execute the instructions to cause the apparatus to determine the radar detection result based on each of the plurality of MUs by:
finding, from a spectrum library through matching, a reference spectrum with a highest similarity for each MU, wherein the spectrum library records a plurality of reference spectrums, wherein each reference spectrum corresponds to detection information, and wherein the detection information comprises at least one of distance information or speed information; and setting the detection information corresponding to the reference spectrum with the highest similarity of each MU as the radar detection result of each MU.

9. The apparatus of claim 8, wherein the detection information corresponding to each reference spectrum in the spectrum library is pre-calculated and stored.

10. The apparatus of claim 8, wherein before finding the reference spectrum with the highest similarity for each MU, the processor is further configured to execute the instructions to cause the apparatus to:
generate one reference spectrum based on one Doppler shift and one signal flight time;
use one piece of the speed information and one piece of the distance information as the detection information corresponding to the one reference spectrum; and
save the speed information and the distance information in the spectrum library, wherein the one piece of the speed information is the one Doppler shift or a moving speed of a first reflective object corresponding to the one Doppler shift, and wherein the one piece of the distance information is the one signal flight time or a distance of a second reflective object corresponding to the one signal flight time.

11. The apparatus of claim 7, wherein the processor is further configured to execute the instructions to cause the apparatus to obtain the time domain sliding step by performing a rounding operation on d0, and wherein d0 meets the following relationship:

$$d0 = \frac{T_{chirp}}{R},$$

wherein $T_{chirp}$ is the frequency modulation period of the radar, and wherein R is an expected radar point cloud density improvement multiple.

12. The apparatus of claim 7, wherein the processor is further configured to execute the instructions to cause the apparatus to intercept the plurality of MUs on a frequency domain signal of the two-dimensional spectrogram in a sliding window manner.

13. A computer program product comprising computer-executable instructions that are stored on a non-transitory computer-readable storage medium and that, when executed by a processor, cause an apparatus to:
transform a beat frequency signal of a radar into a two-dimensional spectrogram by:
dividing the beat frequency signal in a time domain to obtain a plurality of segments of sub-signals, wherein a time domain length of each segment of sub-signal is 1/N of a frequency modulation period of the radar, and wherein N is greater than or equal to 2;
separately performing a Fourier transform on the plurality of segments of sub-signals to obtain frequency domain information of each of the plurality of segments of sub-signals; and
generating the two-dimensional spectrogram based on the frequency domain information of each segment of sub-signal;
intercept, based on a time domain sliding step, a plurality of measurement units (MUs) whose time domain lengths are equal to the frequency modulation period of the radar from the two-dimensional spectrogram, wherein a length of the time domain sliding step is less than the frequency modulation period of the radar; and determine a radar detection result based on each of the plurality of MUs.

14. The computer program product of claim 13, wherein determine the radar detection result based on each of the plurality of MUs comprises:
    finding, from a spectrum library through matching, a reference spectrum with a highest similarity for each MU, wherein the spectrum library records a plurality of reference spectrums, wherein each reference spectrum corresponds to detection information, and wherein the detection information comprises at least one of distance information or speed information; and
    setting the detection information corresponding to the reference spectrum with the highest similarity of each MU as the radar detection result of each MU.

15. The computer program product of claim 14, wherein the detection information corresponding to each reference spectrum in the spectrum library is pre-calculated and stored.

16. The computer program product of claim 14, wherein before finding the reference spectrum with the highest similarity for each MU, the computer-executable instructions further cause the apparatus to:
    generate one reference spectrum based on one Doppler shift and one signal flight time;
    use one piece of the speed information and one piece of the distance information as the detection information corresponding to the one reference spectrum; and
    save the speed information and the distance information in the spectrum library, wherein the one piece of the speed information is the one Doppler shift or a moving speed of a first reflective object corresponding to the one Doppler shift, and wherein the one piece of the distance information is the one signal flight time or a distance of a second reflective object corresponding to the one signal flight time.

17. The computer program product of claim 13, wherein the computer-executable instructions further cause the apparatus to obtain the time domain sliding step by performing a rounding operation on d0, and wherein d0 meets the following relationship:

$$d0 = \frac{T_{chirp}}{R},$$

wherein $T_{chirp}$ is the frequency modulation period of the radar, and wherein R is an expected radar point cloud density improvement multiple.

18. The computer program product of claim 13, wherein the plurality of MUs are intercepted on a frequency domain signal of the two-dimensional spectrogram in a sliding window manner.

* * * * *